United States Patent [19]
Knight

[11] Patent Number: 6,085,003
[45] Date of Patent: Jul. 4, 2000

[54] MULTIFIBER CONNECTOR HAVING A FREE FLOATING FERRULE

[75] Inventor: Keith Alan Knight, Alexander County, N.C.

[73] Assignee: US Conec LTD, Hickory, N.C.

[21] Appl. No.: 09/123,661

[22] Filed: Jul. 28, 1998

[51] Int. Cl.[7] .................................................. G02B 6/38
[52] U.S. Cl. ................................ 385/59; 385/60; 385/62
[58] Field of Search ................................. 385/59, 60, 62, 385/76–78, 81, 86, 87; 439/374, 376, 446, 465, 474

[56] References Cited

U.S. PATENT DOCUMENTS

| | | | |
|---|---|---|---|
| 5,214,730 | 5/1993 | Nagasawa et al. | 385/59 |
| 5,548,677 | 8/1996 | Kakii et al. | 385/92 |
| 5,608,828 | 3/1997 | Coutts et al. | 385/59 |
| 5,619,604 | 4/1997 | Shiflett et al. | 385/59 |
| 5,737,463 | 4/1998 | Weiss et al. | 385/59 |

Primary Examiner—Cassandra Spyrou
Assistant Examiner—Craig Curtis

[57] ABSTRACT

A fiber optic connector is provided which includes a free floating ferrule so as to reliably withstand significant side-pull forces. In other words, the fiber optic connector is designed such that the minimum rotational angle of the combination of the ferrule and the pin clamp within the connector housing is greater than the maximum rotational angle of the connector housing within an adapter. In order to permit the ferrule to be free floating, the fiber optic connector can provide increased clearance or spacing between the combination of the ferrule and the pin clamp and the connector housing. For example, the inner sidewalls of the forward end of the connector housing may have either a beveled or a stepped profile in longitudinal cross-section so as to provide additional clearance at the forwardmost portion of the ferrule. The combination of the rear end of the ferrule and the pin clamp can also have a beveled profile so as to provide clearance at the rearwardmost portion of the ferrule and pin clamp combination. Similarly, the inner sidewalls of the connector housing proximate the rear end of the connector housing can also be tapered at an angle of at least 2° to provide additional clearance.

21 Claims, 5 Drawing Sheets

MULTIFIBER CONNECTOR HAVING A FREE FLOATING FERRULE

FIELD OF THE INVENTION

The present invention relates generally to fiber optic connectors and, more particularly, to multifiber connectors having a free floating ferrule so as to maintain low optical attenuation and direct fiber contact even as side pull forces are applied.

BACKGROUND OF THE INVENTION

A primary objective of most fiber optic connectors is to optically interconnect the optical fibers upon which the fiber optic connector is mounted with other optical fibers or other optical components in a manner which minimizes the attenuation of the optical signals while maintaining direct fiber contact. As the applications for optical communications demand increased levels of performance and, therefore, decreased levels of attenuation, more demands are being placed upon fiber optic connectors to provide a secure optical connection with even lower levels of attenuation and to continue to provide direct fiber contact as the connector is subjected to increased physical loads or forces.

In many applications, a fiber optic connector that is mounted upon the end portions of one or more optical fibers is inserted into a passageway defined by an adapter, such as a sleeve having a generally rectangular cross-section. By inserting another fiber optic connector into the opposite end of the adapter, the fiber optic connectors and, in turn, the optical fibers upon which the fiber optic connectors are mounted can be mated. Alternatively, the adapter can be part of an optical or optoelectronic module for aligning the optical fibers upon which the fiber optic connector is mounted with other optical fibers or other optical components within the module.

Unfortunately, a fiber optic connector and/or the optical fibers upon which the fiber optic connector is mounted are often subject to side pull forces following the insertion of the fiber optic connector into an adapter. Among other effects, these side pull forces can prevent direct fiber contact and can increase the attenuation introduced by the fiber optic connector. As described below, this decreased fiber contact and increased attenuation is believed to be due to insufficient clearance between the various components of the fiber optic connector and the adapter.

A conventional multifiber connector includes a connector housing or plug, a ferrule such as an MT ferrule mounted upon the end portions of a plurality of optical fibers, a pin clamp, a spring and a spring push. Typically, the ferrule is positioned within a lengthwise extending passageway defined by the connector housing such that the shoulder of the ferrule engages a corresponding shoulder of the connector housing that projects into the passageway proximate the forward end of the connector housing. The pin clamp and spring are also disposed within the passageway defined by the connector housing to the rear of the ferrule. As such, the pin clamp can engage guide pins that extend through corresponding bores defined by the ferrule. In addition, the spring push can be at least partially inserted into the rear end of the passageway defined by the connector housing such that the spring which is compressed between the spring push and the pin clamp exerts a forwardly-directed force upon the pin clamp and the ferrule such that the forward end of the ferrule is extended beyond the forward end of the connector housing.

Figure 1:
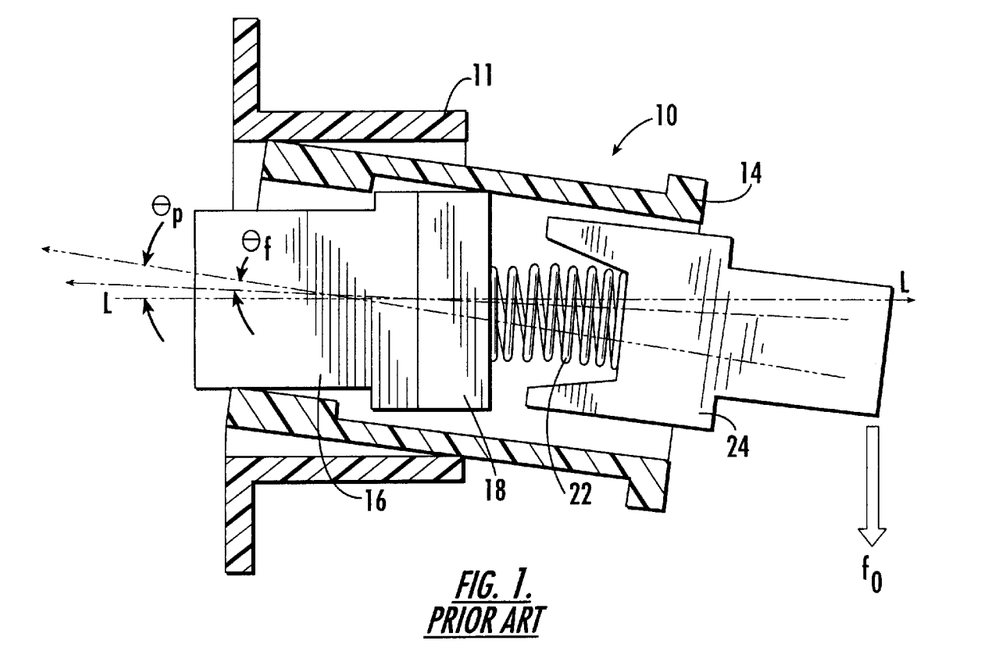
FIG. 1 is a schematic representation of a conventional fiber optic connector inserted within the passageway defined by an adapter and subjected to a side pull force $f_0$.

Once the fiber optic connector 10 has been inserted into an adapter 11 and side pull forces $f_0$ are applied, the connector housing 14 will generally rotate through an angle $\theta_p$ relative to the adapter and, more particularly, relative to a longitudinal axis L defined by the passageway defined by the adapter. This rotation of the connector housing will generally continue until the connector housing contacts the inner sidewalls of the adapter as shown in FIG. 1. As also shown in FIG. 1 following rotation of the fiber optic connector relative to the adapter, the connector housing contacts the ferrule 16 and/or the pin clamp 18 as the connector rotates in response to the side pull forces $f_0$ so as to cause the ferrule and the pin clamp to also rotate with the connector housing through an angle $\theta_f$ relative to the longitudinal axis L defined by the adapter. As a result of this rotation of the ferrule, the alignment of the optical fibers upon which the ferrule is mounted will be significantly impaired, thereby preventing direct fiber contact and attenuating the optical signals to a greater degree. As will be apparent, the rotation of the ferrule and, in turn, the attenuation of the optical signals is particularly significant in instances in which single mode optical signals are being transmitted, in instances in which the ferrule is mated with another ferrule that is designed to be fixed in place, i.e., a fixed ferrule, and in instances in which the connector housing is somewhat undersized for the respective adapter so as to permit the connector housing to rotate through a relatively large angle $\theta_p$ with respect to the longitudinal axis L defined by the adapter.

SUMMARY OF THE INVENTION

A multifiber connector is therefore provided according to the present invention which includes a free floating ferrule so as to withstand side pull forces without increasing the attenuation of the optical signals. In addition to a connector housing, the multifiber connector of the present invention includes a ferrule and a pin clamp which can rotate as a unit through an angle relative to a longitudinal axis defined by the passageway extending through the connector housing that is greater than the angle through which the connector housing can rotate relative to the longitudinal axis defined by the passageway extending through the adapter. As such, the connector housing can rotate to accommodate side pull forces without also requiring the ferrule to rotate relative to the longitudinal axis defined by the passageway extending through the adapter. The fiber optic connector of the present invention will therefore maintain a secure optical connection with low optical attenuation and direct fiber contact even as significant side pull forces, such as 5 or 10 pounds, are applied.

According to the present invention, the multifiber connector includes a connector housing having inner and outer sidewalls extending between forward and rear ends. In addition, the inner sidewalls of the connector housing define a passageway extending lengthwise between the forward and rear ends. The multifiber connector also includes a ferrule for mounting upon end portions of a plurality of optical fibers. The ferrule has side surfaces extending lengthwise between opposed forward and rear ends and is disposed at least partially within the passageway defined by the connector housing such that the forward end of the ferrule is exposed through the forward end of the connector housing.

In order to permit the connector housing to rotate freely through a minimum angle relative to the ferrule and the pin clamp combination that exceeds the maximum angle through which the connector housing can rotate with respect to the longitudinal axis of the adapter, the multifiber connector is designed such that increased clearance is provided between the inner sidewalls of the connector housing and the ferrule and pin clamp combination, particularly at the forward end of the connector housing and the rear ends of the pin clamp and the ferrule. With respect to the clearance at the forward end of the ferrule, the multifiber connector of one embodiment is designed such that at least one pair and, more preferably, both pairs of opposed side surfaces of the ferrule are separated by a cumulative lateral spacing of at least 0.32 mm from corresponding adjacent portions of the inner sidewalls of the connector housing at the forward end thereof. As such, the multifiber connector of this embodiment of the present invention permits significant rotation of the connector housing relative to the ferrule in response to side pull forces.

According to one advantageous embodiment, the ferrule has a forward portion and a rear portion that is larger than the forward portion. As such, the ferrule also includes a shoulder between the forward and rear portions. According to this embodiment, the connector housing also includes a shoulder projecting into the passageway at a location proximate the forward end of the connector housing for engaging the shoulder of the ferrule. In order to provide the desired lateral clearance at the forward end of the ferrule, the inner sidewalls of the connector housing of this embodiment are preferably shaped such that the passageway is larger in lateral cross-sectional area at the forward end of the connector housing than at the location of the inwardly projecting shoulder such that the connector housing can freely rotate relative to the ferrule in response to side pull forces.

According to this embodiment, at least a portion of the inner sidewalls of the connector housing between the inwardly projecting shoulder and the forward end can be beveled. For example, the beveled portion of the inner sidewalls of the connector housing can extend continuously from the inwardly projecting shoulder to the forward end of the connector housing. Alternatively, the portion of the inner sidewalls of the connector housing between the inwardly projecting shoulder and the forward end of the connector housing can include an untapered first segment adjacent the inwardly projecting shoulder and a beveled second section adjacent the forward end of the connector housing. According to another embodiment, the portion of the inner sidewalls of the connector housing between the inwardly projecting shoulder and the forward end of the connector housing can have a stepped profile. According to this embodiment, the portion of the inner sidewalls of the connector housing between the inwardly projecting shoulder and the forward end of the connector housing can include an untapered first segment adjacent the inwardly projecting shoulder and an untapered second segment adjacent the forward end of the connector housing that is sized such that the untapered second segment defines a portion of the passageway that has a larger area in lateral cross-section than the portion of the passageway defined by the untapered first segment. By designing the multifiber connector according to any of these embodiments, however, additional clearance is provided between the forward end of the ferrule and the adjacent inner sidewalls of the connector housing such that rotation of connector housing in response to side pull forces does not cause the ferrule to rotate, thereby maintaining the low optical attenuation of the multifiber connector.

The multifiber connector can also include a pin clamp that is mechanically coupled to the ferrule, such as by guide pins, for movement therewith. The pin clamp includes a forward end adjacent the rear end of the ferrule, an opposed rear end, and side surfaces extending between the forward and rear ends. In order to provide additional clearance at the rear end of the ferrule and pin clamp combination so as to permit further rotation of the connector housing relative to the ferrule and pin clamp combination, the side surfaces of the pin clamp of this embodiment are beveled such that the forward end of the pin clamp is larger than the opposed rear end. In addition, the side surfaces of the ferrule that are adjacent the rear end of the ferrule can also be beveled. In this regard, the beveled side surfaces of the ferrule and the pin clamp can define continuously beveled surfaces. In the embodiment in which the ferrule has a forward portion and a rear portion that is larger than the forward portion, the side surfaces of the rear portion of the ferrule can be beveled. Similarly, the inner sidewalls of the connector housing proximate the rear end of the connector housing can also be beveled such that the passageway defined by the connector housing increases in size in a direction extending from a medial portion of the connector housing to the rear end of the connector housing. For example, in one advantageous embodiment, the inner sidewalls of the connector housing can be continuously tapered at an angle of at least 2° relative to the longitudinal axis of the passageway defined by the connector housing from the inwardly projecting shoulder to the rear end of the connector housing. As such, the multifiber connector of this embodiment can provide additional clearance at the rear portion of the ferrule and pin clamp combination in order to facilitate rotation of the connector housing relative to the ferrule in response to side pull forces.

The multifiber connector of the present invention therefore advantageously permits the connector housing to freely rotate through a minimum angle relative to the ferrule and pin clamp combination that exceeds the maximum angle through which the connector housing can rotate relative to the longitudinal axis defined by the adapter. As such, the application of side pull forces to the multifiber connector of the present invention will result in the connector housing rotating relative to the longitudinal axis defined by the adapter up to the maximum angle without ever imparting forces to the ferrule and/or the pin clamp which would cause the ferrule to rotate relative to the longitudinal axis defined by the adapter. As such, the alignment of the ferrule and, more importantly, the alignment of the optical fibers upon which the ferrule is mounted to other optical fibers or other optical components is therefore maintained as side pull forces are applied to the multifiber connector. Thus, the multifiber connector of the present invention maintains low optical attenuation and direct fiber contact even as side pull forces are applied thereto.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 2:
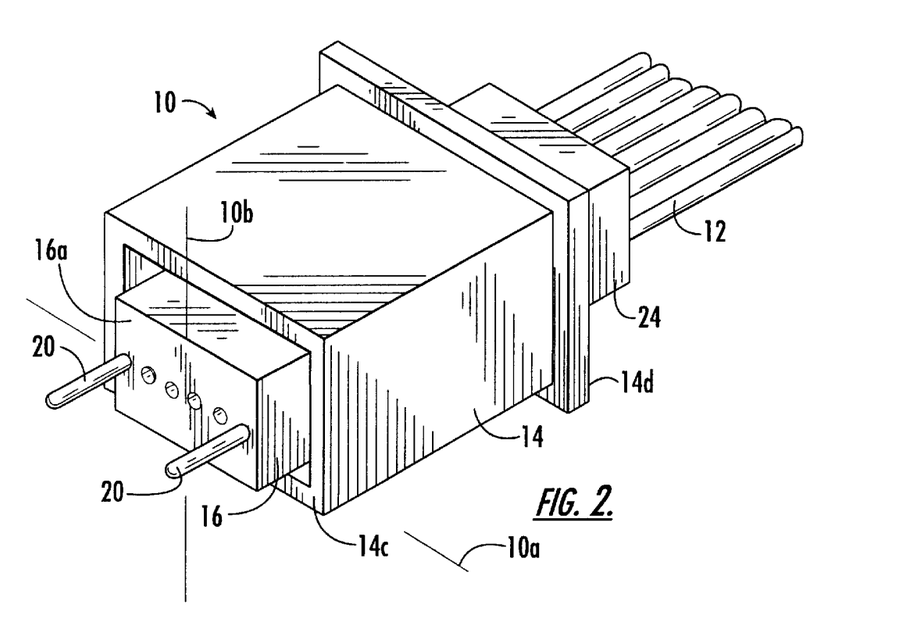
FIG. 2 is a perspective view of a multifiber connector according to one advantageous embodiment of the present invention.

As shown in FIG. 2, the fiber optic connector 10 of the present invention is a multifiber connector mounted upon the end portions of a plurality of optical fibers 12, such as a plurality of ribbonized fibers. As such, the multifiber connector can be an MTP-style connector, an MPO-style connector, an MPP-style connector or the like. Although multifiber connectors can be mated in a variety of fashions, multifiber connectors are frequently inserted into adapters 11 which align the multifiber connector with other multifiber connectors or with other optical components. More particularly, a multifiber connector is typically inserted into a passageway 11a (FIG. 4) that extends lengthwise through the adapter and which defines a first longitudinal axis 11b. As such, the multifiber connector can also be aligned along the first longitudinal axis defined by the adapter in the absence of external forces.

Figure 3A:
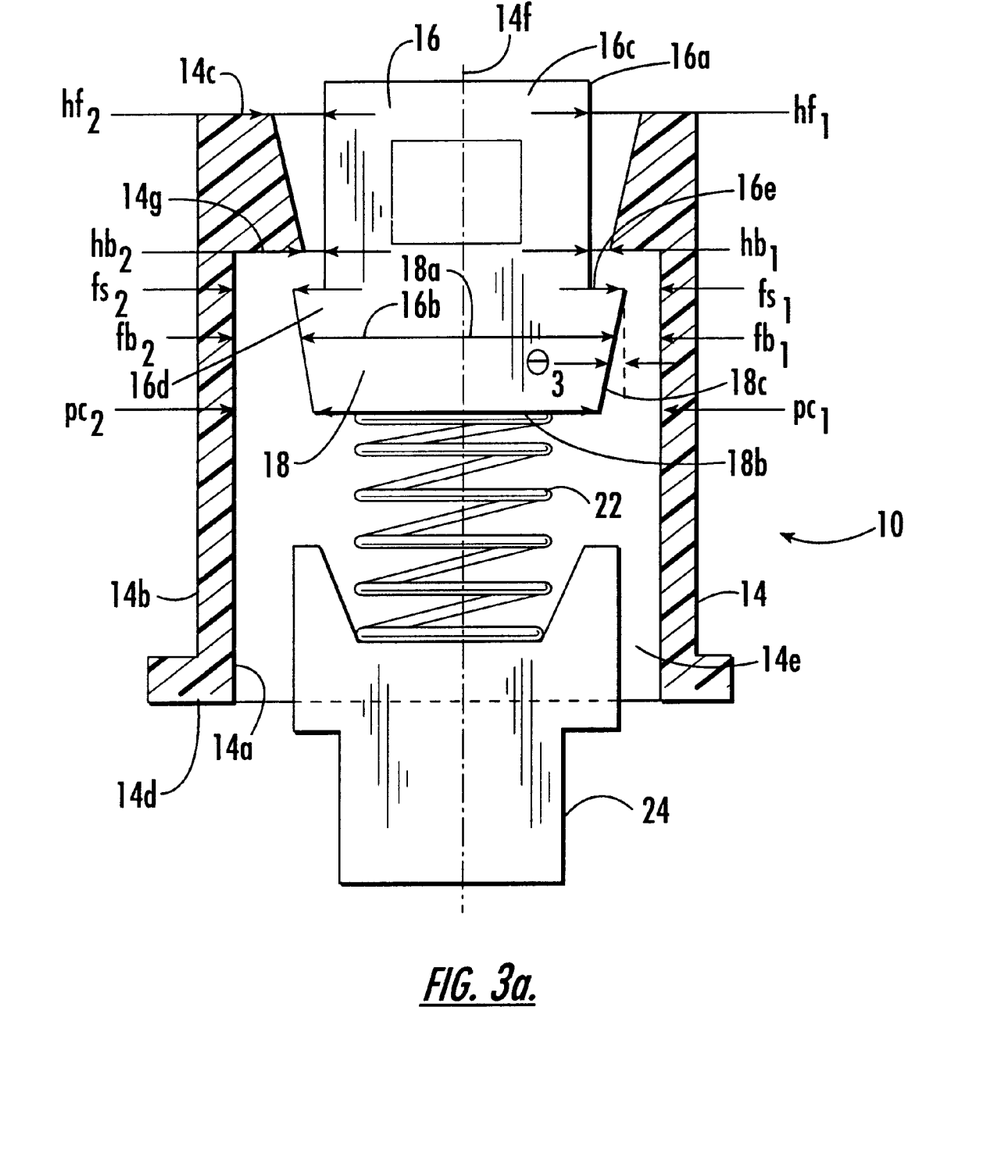
FIGS. 3a and 3b are schematic representations of a multifiber connector according to one advantageous embodiment of the present invention taken along the preferential and non-preferential axes, respectively.
Figure 3B:
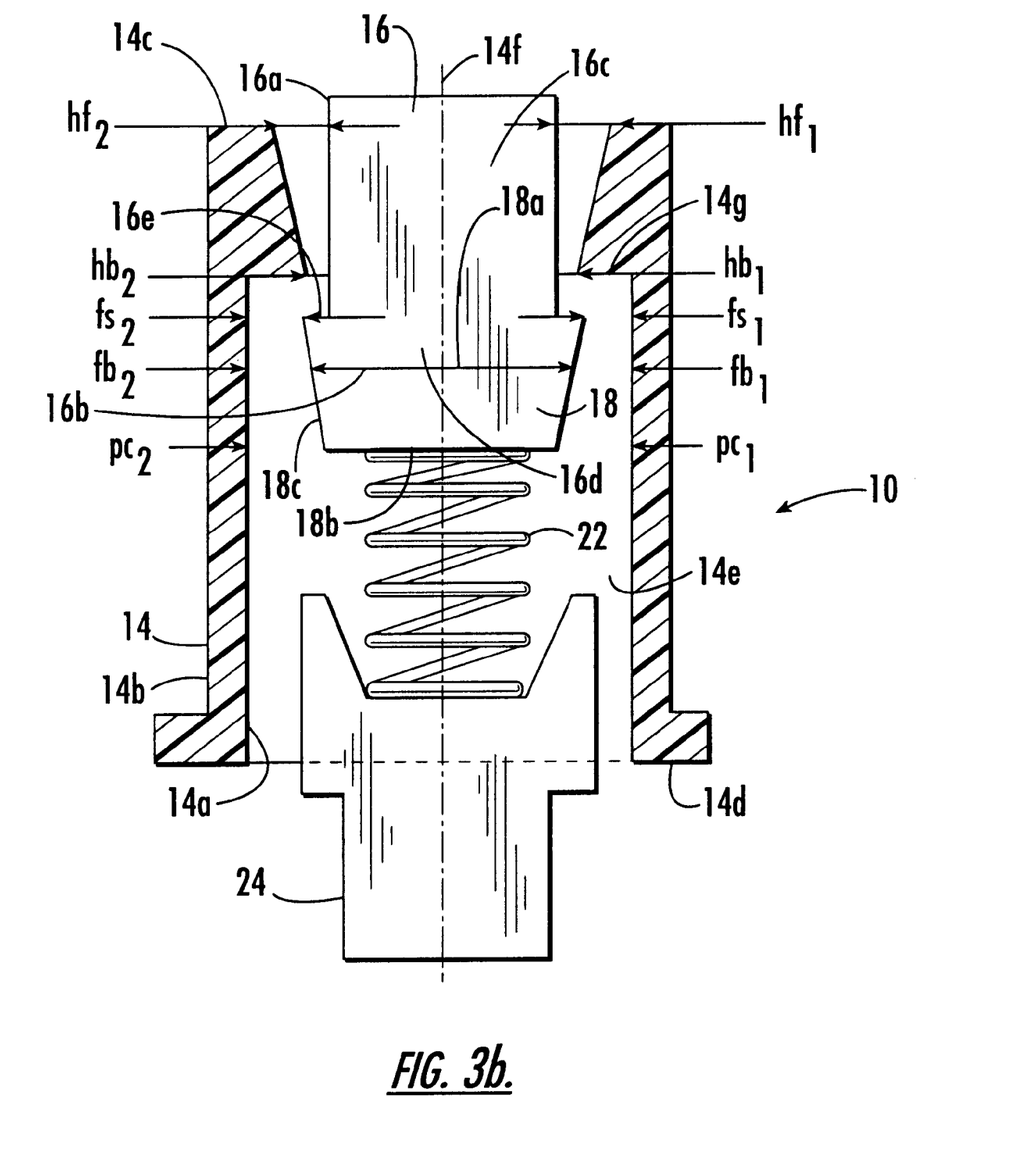

As shown in FIGS. 3a and 3b, the multifiber connector 10 includes a connector housing 14 having inner and outer sidewalls 14a, 14b extending between opposed forward and rear ends 14c, 14d. In addition, the connector housing defines a passageway 14e extending lengthwise between and opening through the opposed forward and rear ends. As illustrated, the passageway defines a second longitudinal axis 14f extending through the connector housing. In the absence of side pull forces, the first and second longitudinal axes defined by the passageways defined by the adapter 11 and the connector housing 14, respectively, are generally parallel and, in some instances, coextensive. Although the connector housing can have a variety of shapes in lateral cross-section, the connector housing of the multifiber connector of the present invention generally has a substantially rectangular shape in lateral cross-section as shown in FIG. 2.

The multifiber connector 10 of the present invention also includes a ferrule 16 mounted upon end portions of the plurality of optical fibers 12, such as the plurality of ribbonized fibers. Although the multifiber connector can include a variety of different ferrules, the multifiber connector of one advantageous embodiment includes an MT-type ferrule having a generally rectangular shape in lateral cross-section. As illustrated in FIGS. 3a and 3b, the ferrule is disposed at least partially within the passageway 14e defined by the connector housing 14 such that the forward end 16a of the ferrule is exposed through the opening in the forward end 14c of the connector housing.

The multifiber connector 10 of the present invention also includes a pin clamp 18. The pin clamp is disposed generally adjacent the rear end 16b of the ferrule 16 and within the passageway 14e defined by the connector housing 14. As known to those skilled in the art, the pin clamp defines a pair of openings (not shown) that are sized to receive and engage end portions of respective ones of a pair of guide pins 20. The guide pins extend through corresponding bores defined lengthwise through the ferrule such that the pin clamp and the ferrule are mechanically coupled. The ends of the guide pins, opposite the ends engaged by the pin clamp, extend beyond the forward end 16a of the ferrule for insertion within corresponding bores defined by the ferrule of another fiber optic connector with which the multifiber connector of the present invention is aligned and mated.

As shown in FIGS. 3a and 3b, the multifiber connector 10 of the present invention can also include a spring 22 disposed rearward of the pin clamp 18 and within the passageway 14e defined by the connector housing 14. In addition, the multifiber connector can include a spring push 24 at least partially inserted into the passageway defined by the connector housing through the opening in the rear end 14d of the connector housing. As such, the spring will be compressed between the pin clamp and the spring push and will urge the pin clamp and the ferrule forward relative to the connector housing. The ferrule and the pin clamp are retained within the passageway defined by the connector housing, however, by engagement of respective shoulders of the connector housing and the ferrule. As shown in FIGS. 3a and 3b, for example, a ferrule can include a forward portion 16c and a rear portion 16d that is larger than the forward portion. As such, the ferrule of this embodiment can include a shoulder 16e between the forward and rear portions. In addition, the inner sidewalls 14a of the connector housing can include a shoulder 14g projecting into the passageway at a location proximate the forward end 14c of the connector housing. As such, the spring urges the combination of the pin clamp and the ferrule forward relative to the connector housing until the shoulder of the ferrule contacts the inwardly projecting shoulder of the connector housing.

The multifiber connector 10 of the present invention is designed such that the ferrule 16 remains free floating within the connector housing 14 even as significant side pull forces are applied to the multifiber connector. As such, the multifiber connector is designed such that the minimum rotational angle of the combination of the ferrule and the pin clamp 18 within the connector housing is greater than the maximum rotational angle of the connector housing within the adapter 11. In other words, the multifiber connector of the present invention is designed such that the ferrule and the pin clamp are free to rotate as a unit relative to the second longitudinal axis 14f defined by the connector housing up to a maximum angle that is greater than the maximum angle, such as 3.4°, through which the connector housing can rotate relative to the first longitudinal axis 11b defined by the adapter.

Figure 4:
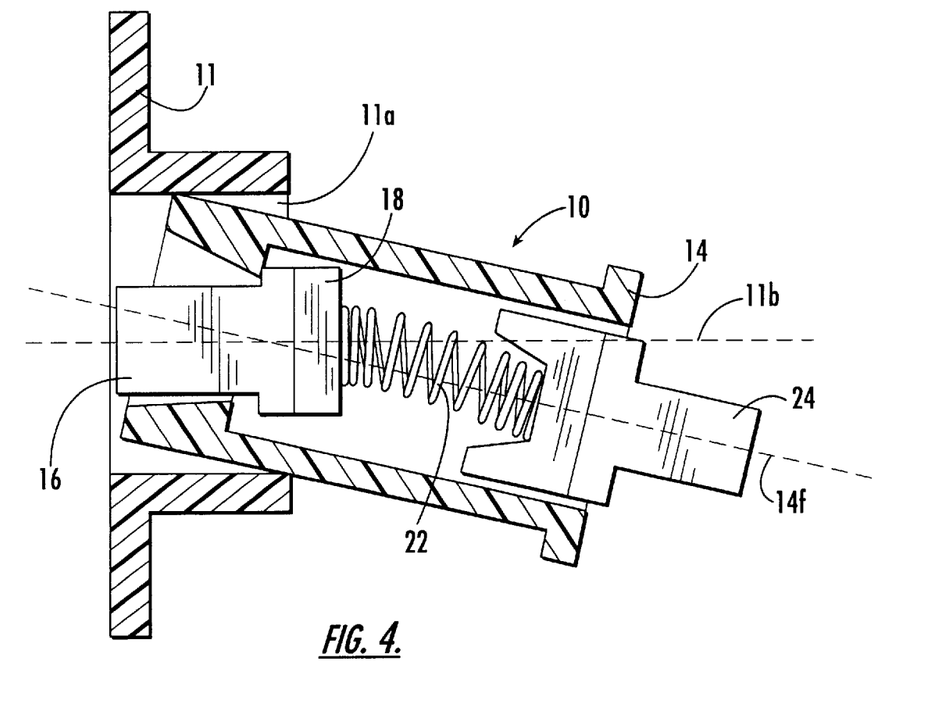
FIG. 4 is a schematic representation of a multifiber connector according to one advantageous embodiment of the present invention that is inserted within the passageway defined by an adapter and is subjected to a side pull force.

As such, side pull forces applied to the multifiber connector 10 of the present invention will cause the connector housing 14 to rotate within the adapter to the position shown in FIG. 4. However, the connector housing will be prevented from rotating beyond this predetermined maximum angle by the engagement of the connector housing by the adapter. Since the combination of the ferrule 16 and the pin clamp 18 are free to rotate as a unit through a minimum angle relative to the longitudinal axis 14f defined by the connector housing that exceeds the maximum angle through which the connector housing can rotate relative to the adapter, the rotation of the connector housing is halted prior to any contact between the connector housing and the ferrule and/or the pin clamp which would apply forces to the ferrule and/or pin clamp which would tend to cause the ferrule and the pin clamp to rotate relative to the first longitudinal axis 11b defined by the adapter. As such, the ferrule and, more importantly, the optical fibers 12 upon which the ferrule is mounted will remain aligned and mated within the adapter notwithstanding the application of the side pull forces.

In contrast to conventional multifiber connectors, the multifiber connector 10 of the present invention is designed such that the clearances between the inner sidewalls 14a of the connector housing 14 and the ferrule 16 and the pin clamp 18 are increased in a manner which maintains the alignment of the ferrule relative to the connector housing, while at the same time permitting the ferrule to freely float within the connector housing as side pull forces are applied to the multifiber connector, thereby maintaining low optical attenuation as side pull forces are applied. In particular, it has been determined that the clearance between the inner sidewalls of the connector housing and the forward end 16a of the ferrule and the rear end of the pin clamp are particularly critical to the freedom with which a ferrule floats within the connector housing as the multifiber connector is subjected to side pull forces.

With respect to the clearance between the inner sidewalls 14a of the connector housing 14 and the forward end 16a of the ferrule 16, the multifiber connector 10 of one advantageous embodiment is designed such that at least one pair of opposed side surfaces of the ferrule is laterally separated by a cumulative lateral spacing hf of at least 0.32 mm from corresponding adjacent portions of the inner sidewalls of the connector housing at the forward end 14c thereof. As such, the connector housing of this embodiment can freely rotate relative to the ferrule in response to side pull forces.

As shown in Table 1 below, the cumulative lateral spacing hf between at least one pair of opposed side surfaces of the ferrule 16 and the corresponding adjacent portions of the inner sidewalls 14a of the connector housing 14 at the forward end 14c thereof is the sum of the lateral separation $hf_1$ of a first side surface of the ferrule to the adjacent portion of the inner sidewall of the connector housing and the lateral separation $hf_2$ of a second side surface of the ferrule, opposite the first side surface, to the adjacent portion of the inner sidewall of the connector housing.

TABLE 1

| Reference Point | Minimum Clearance |
| --- | --- |
| Housing front (hf = $hf_1$ + $hf_2$) | 0.32 mm |
| Housing back (hb = $hb_1$ + $hb_2$) | 0.03 mm |
| Ferrule shoulder (fs = $fs_1$ + $fs_2$) | 0.05 mm |
| Ferrule back (fb = $fb_1$ + $fb_2$) | 0.11 mm |
| Pin clamp (pc = $pc_1$ + $pc_2$) | 0.32 mm |

As indicated in Table 1 above for one embodiment of a multifiber connector 10 of the present invention, the cumulative lateral spacing hf between at least one pair of opposed side surfaces of the ferrule 16 and corresponding adjacent portions of the inner sidewall 14a of the connector housing 14 at the forward end 14c thereof are at least 0.32 mm. Depending upon the size of the multifiber connector and the anticipated side pull forces to which the multifiber connector will be subjected, however, the multifiber connector of the present invention may define clearances other than those set forth in Table 1 without departing from the spirit and scope of the present invention.

As known to those skilled in the art, the multifiber ferrule 10 generally defines preferential and non-preferential planes 10a, 10b that are mutually orthogonal. As shown in FIG. 2, the multifiber ferrule is typically mounted upon the end portions of a plurality of optical fibers 12 such that the optical fibers are maintained by the ferrule 16 in a side-by-side relationship. Thus, the preferential axis defined by a ferrule generally extends parallel to the plane in which the optical fibers lie. Correspondingly, the non-preferential axis extends perpendicular to both the preferential axis and the plane in which the plurality of optical fibers lie. Once inserted into the passageway 14e defined by the connector housing 14 of the multifiber connector of the present invention, the preferential and non-preferential axes defined by the ferrule are also perpendicular to the second longitudinal axis 14f defined by the passageway.

In one embodiment, the multifiber connector 10 is preferably designed such that the cumulative lateral spacing hf taken along a line parallel to the preferential axis 10a between the pair of opposed side surfaces of the ferrule 16 and corresponding adjacent portions of the inner sidewalls 14a of the connector housing 14 at the forward end 14c thereof is at least 0.32 mm. While only that pair of opposed side surfaces of the ferrule through which the preferential axis extends must have a cumulative lateral spacing hf with respect to corresponding adjacent portions of the inner sidewalls of the connector housing of at least 0.32 mm, each pair of opposed side surfaces of the ferrule is preferably separated by a cumulative lateral spacing hf of at least 0.32 mm from corresponding adjacent portions of the inner sidewalls of the connector housing.

In order to have the desired cumulative lateral spacing hf between each pair of opposed side surfaces of the ferrule 16 and the corresponding adjacent portions of the inner sidewalls 14a of the connector housing 14, the multifiber connector 10 of one advantageous embodiment includes a connector housing having a uniquely designed forward end 14c. As shown in FIGS. 3a and 3b, the connector housing of this advantageous embodiment includes inner sidewalls that are shaped such that the passageway 14e is larger in lateral cross-sectional area at the forward end of the connector housing than at the location of the inwardly projecting shoulder 14g to thereby facilitate rotation of the connector housing relative to the ferrule in response to the side pull forces.

Figures 5A, 5B, 5C:
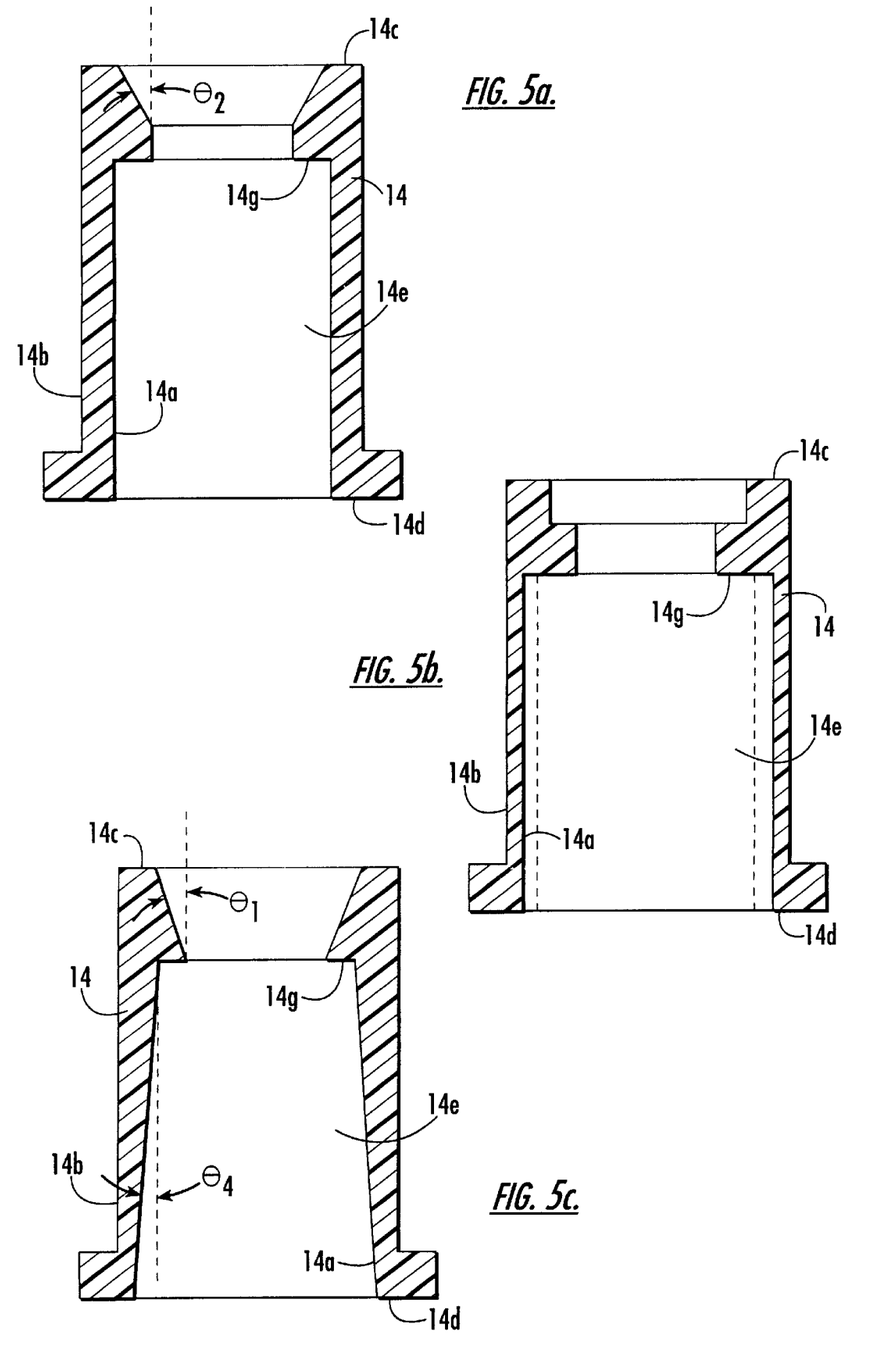
FIGS. 5a–5c are cross-sectional views of the connector housing of the multifiber connector which illustrate other advantageous embodiments of the present invention.

The portion of the inner sidewalls 14a of the connector housing 14 between the inwardly projecting shoulder 14g and the forward end 14c can have several different profiles without departing from the spirit and scope of the present invention. For example, at least a portion of the inner sidewalls of the connector housing between the inwardly projecting shoulder and the forward end can be beveled or tapered. As shown in FIGS. 3a and 3b, the beveled portion of the inner sidewalls of the connector housing can extend continuously from the inwardly projecting shoulder to the forward end of the connector housing. Although the inner sidewalls can be beveled in a variety of manners, the inner sidewalls of the connector housing of one embodiment of the multifiber connector are beveled at an angle $\theta_1$ of approximately 3.59° relative to the longitudinal axis 14f defined by the passageway 14e through connector housing 14. See FIG. 5c. Alternatively, the portion of the inner sidewalls of the connector housing between the inwardly projecting shoulder and the forward end of the connector housing can include an untapered first segment adjacent the inwardly projecting shoulder and a beveled second segment adjacent the forward end of the connector housing, as shown in FIG. 5a. As described above, the second segment can be beveled at a variety of angles, but typically is beveled at an angle $\theta_2$ of approximately 3.66° relative to the longitudinal axis defined by the passageway through the connector housing.

Instead of having inner sidewalls 14a that are beveled adjacent the forward end 14c of the connector housing 14, the portion of the inner sidewalls of the connector housing between the inwardly projecting shoulder 14g and the forward end of the connector housing can have a stepped configuration. In this embodiment shown in FIG. 5b, the portion of the inner sidewalls of the connector housing between the inwardly projecting shoulder and the forward end of the connector housing can include an untapered first segment adjacent the inwardly projecting shoulder and an untapered second segment adjacent the forward end of the connector housing. In order to provide additional clearance between the forward end 16a of the ferrule 16 and the inner sidewalls of the connector housing, the untapered second segment preferably defines a portion of the passageway 14e that has a larger area in lateral cross-section than the portion of the passageway defined by the untapered first segment.

In either embodiment, the ferrule 16 is free to float within the connector housing 14 as side pull forces are applied to the fiber optic connector 10 at least partially as a result of the additional clearance that is provided between the forward end 16a of the ferrule and the adjacent inner sidewalls 14a of the connector housing. While the multifiber connector of one embodiment includes a connector housing in which only those inner sidewalls adjacent the opposed side surfaces of the ferrule through which the preferential axis 10a extends have either a beveled or a stepped configuration, the multifiber ferrule of one advantageous embodiment is designed such that the inner sidewalls of the connector housing adjacent each of the side surfaces of the ferrule have the same configuration, albeit preferably either a beveled or a stepped configuration.

In addition to the increased clearance at the forward end 14c of the connector housing 14 as reflected in Table 1, the multifiber ferrule 10 of one embodiment is designed so as to provide a cumulative lateral clearance hb of at least 0.03 mm between each pair of opposed side surfaces of the ferrule 16 and the inwardly projecting shoulder 14g of the connector housing. In addition, the multifiber connector can provide a cumulative lateral clearance fs of at least 0.05 mm between each pair of opposed side surfaces of the rear portion 16d of the ferrule and the corresponding adjacent inner sidewalls 14a of the connector housing.

Similarly, the multifiber connector 10 is preferably designed to provide additional clearance relative to conventional multifiber connectors between the rear ends of the ferrule 16 and the pin clamp 18 and corresponding adjacent inner sidewalls 14a of the connector housing 14. As reflected in Table 1 above, the multifiber connector of one embodiment provides a cumulative lateral clearance fb of at least 0.11 mm between the opposed side surfaces of the ferrule at the rear end 16b of the ferrule and the corresponding adjacent inner sidewalls of the connector housing. In addition, the multifiber connector can provide a cumulative lateral clearance pc of at least 0.32 mm between the opposed side surfaces of the pin clamp at the rear end 18b of the pin clamp and the corresponding adjacent inner sidewalls of the connector housing. However, the multifiber connector can provide different amounts of clearance depending upon the size of the components of the multifiber connector and the anticipated side loads to which the multifiber connector will be subjected.

In order to provide the desired clearance between the rear ends of the pin clamp 18 and the ferrule 16 and the corresponding adjacent inner sidewalls 14a of the connector housing 14, the multifiber connector 10 of one advantageous embodiment includes a pin clamp having a forward end 18a adjacent the rear end 16b of the ferrule, an opposed rear end 18b, and side surfaces 18c extending between the forward and rear ends that are beveled such that the forward end of the pin clamp is larger than the opposed rear end, thereby facilitating rotation of the connector housing relative to the pin clamp and the ferrule in response to side pull forces. See FIGS. 3a and 3b. While the side surfaces of the pin clamp can be beveled at a variety of angles, the side surfaces of the pin clamp of one advantageous embodiment are beveled at an angle $\theta_3$ of approximately 3.66° relative to an axis extending lengthwise through the pin clamp. While only the side surfaces of the pin clamp through which the preferential plane 10a extends may be beveled in one embodiment, each of the side surfaces of the pin clamp can be beveled, if so desired. In addition to the pin clamp, the side surfaces of the ferrule adjacent the rear end of the ferrule can also be beveled. Typically, the side surfaces of the ferrule and the pin clamp are beveled at the same angle $\theta_3$ such that the beveled side surfaces of the ferrule and the pin clamp define continuously beveled surfaces. In the embodiment illustrated in FIGS. 3a and 3b in which the ferrule has a forward portion 16c and a rear portion 16d that is larger than the forward portion, the side surfaces of the rear portion of the ferrule are typically beveled, such as at an angle equal to the angle $\theta_3$ at which the side surfaces of the pin clamp are beveled.

By beveling the side surfaces 18c of the pin clamp 18 and, in some embodiments, the side surfaces of the ferrule 16 adjacent the rear end 16b of the ferrule, the multifiber connector 10 provides additional clearance for the connector housing 14 to rotate prior to contacting or otherwise engaging the pin clamp and/or the ferrule so as to disadvantageously apply forces to the pin clamp and/or the ferrule in response to side pull forces applied to the multifiber connector. In order to provide still additional clearance, the inner sidewalls 14a of the connector housing proximate the rear end 14d can also be thinned relative to conventional connector housings. See FIG. 5b, for example, in which the sidewalls of a conventional connector housing are depicted by dashed lines and the sidewalls of the connector housing of the illustrated embodiment are cross-hatched. In addition to thinning the sidewalls or instead of thinning the sidewalls, the inner sidewalls of the connector housing proximate the rear end can be beveled or tapered such that the passageway defined through the connector housing increases in size in a direction from a medial portion of the connector housing to the rear end of the connector housing. Although the inner sidewalls of the connector housing proximate the rear end can be tapered at different angles, the inner sidewalls of one advantageous embodiment are tapered at an angle $\theta_4$ of at least 2° and, more preferably, approximately 3.66°, relative to the longitudinal axis 14f defined by the passageway defined through the connector housing. As shown in FIG. 5c, for example, the inner sidewalls can be continuously tapered from the inwardly projecting shoulder 14g to the rear end of the connector housing. As such, the multifiber connector of this advantageous embodiment provides still additional clearance between the rearwardmost portions of the ferrule and the pin clamp and the corresponding adjacent inner sidewalls of the connector housing.

The multifiber connector 10 of the present invention therefore advantageously permits the connector housing 14 to freely rotate through a minimum angle relative to the ferrule 16 and pin clamp 18 combination that exceeds the maximum angle through which the connector housing can rotate relative to the longitudinal axis 11b defined by the adapter 11. As such, the application of side pull forces to the multifiber connector of the present invention will result in the connector housing rotating relative to the longitudinal axis defined by the adapter up to the maximum angle without ever imparting forces to the ferrule and/or the pin clamp which would cause the ferrule to rotate relative to the longitudinal axis defined by the adapter. As such, the alignment of the ferrule and, more importantly, the alignment of the optical fibers 12 upon which the ferrule is mounted to other optical fibers or other optical components is therefore maintained as side pull forces are applied to the multifiber connector. Thus, the multifiber connector of the present invention maintains low optical attenuation and direct fiber contact even as side pull forces are applied thereto.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A multifiber connector adapted to be inserted at least partially within a passageway defined in an adapter, wherein the passageway defined in the adapter defines a first longitudinal axis, and wherein the multifiber connector comprises:

a connector housing having inner and outer sidewalls extending between forward and rear ends, wherein the inner sidewalls of said connector housing define a passageway extending lengthwise between the forward and rear ends, and wherein the passageway defined by the inner sidewalls of said connector housing defines a second longitudinal axis;

a ferrule for mounting upon end portions of a plurality of optical fibers, said ferrule disposed at least partially within the passageway defined by said connector housing such that the forward end of said ferrule is exposed through the forward end of said connector housing; and a pin clamp mechanically coupled to said ferrule for movement therewith, wherein said connector housing is shaped such that said ferrule and said pin clamp are free to rotate as a unit through at least a minimum angle relative to the second longitudinal axis defined by said connector housing that is greater than a maximum angle through which said connector housing can rotate relative to the first longitudinal axis defined by the adapter to thereby facilitate rotation of said connector housing relative to said ferrule in response to side pull forces.

2. A multifiber connector according to claim 1 wherein said ferrule has side surfaces extending lengthwise between opposed forward and rear ends, and wherein at least one pair of opposed side surfaces of said ferrule is separated by a cumulative lateral spacing of at least 0.32 mm from corresponding portions of the inner sidewalls of said connector housing at the forward end thereof.

3. A multifiber connector according to claim 1 wherein said ferrule has a forward portion and a rear portion that is larger than the forward portion such that said ferrule also includes a shoulder between the forward and rear portions, wherein said connector housing has inner and outer sidewalls extending between forward and rear ends and a shoulder projecting into the passageway defined by said connector housing at a location proximate the forward end of said connector housing for engaging the shoulder of said ferrule, and wherein the inner sidewalls of said connector housing are shaped such that the passageway defined by said connector housing is larger in lateral cross-sectional area at the forward end of said connector housing than at the location of the inwardly projecting shoulder.

4. A multifiber connector according to claim 3 wherein at least a portion of the inner sidewalls of said connector housing between the inwardly projecting shoulder and the forward end is beveled.

5. A multifiber connector according to claim 4 wherein the beveled portion of the inner sidewalls of said connector housing extends continuously from the inwardly projecting shoulder to the forward end of said connector housing.

6. A multifiber connector according to claim 4 wherein the portion of the inner sidewalls of said connector housing between the inwardly projecting shoulder and the forward end of said connector housing comprises:

an untapered first segment adjacent the inwardly projecting shoulder; and a beveled second segment adjacent the forward end of said connector housing.

7. A multifiber connector according to claim 3 wherein the portion of the inner sidewalls of said connector housing between the inwardly projecting shoulder and the forward end of said connector housing comprises:

an untapered first segment adjacent the inwardly projecting shoulder; and an untapered second segment adjacent the forward end of said connector housing, wherein the untapered second segment defines a portion of the passageway defined by said connector housing that has a larger area in lateral cross-section than the portion of said passageway defined by said connector housing defined by the untapered first segment such that the portion of the inner sidewalls of said connector housing between the inwardly projecting shoulder and the forward end of said connector housing has a stepped configuration.

8. A multifiber connector comprising:

a ferrule for mounting upon end portions of a plurality of optical fibers, said ferrule having a forward portion and a rear portion that is larger than the forward portion such that said ferrule also includes a shoulder between the forward and rear portions; and a connector housing having inner and outer sidewalls extending between forward and rear ends, wherein the inner sidewalls of said connector housing define a lengthwise extending passageway and include a shoulder projecting into the passageway at a location proximate the forward end of said connector housing for engaging the shoulder of said ferrule, and wherein the inner sidewalls of said connector housing are shaped such that the passageway is larger in lateral cross-sectional area at the forward end of said connector housing than at the location of the inwardly projecting shoulder to thereby facilitate rotation of said connector housing relative to said ferrule in response to side pull forces.

9. A multifiber connector according to claim 8 wherein at least one pair of opposed side surfaces of said ferrule is separated by a cumulative lateral spacing of at least 0.32 mm from corresponding portions of the inner sidewalls of said connector housing at the forward end thereof.

10. A multifiber connector according to claim 8 wherein at least a portion of the inner sidewalls of said connector housing between the inwardly projecting shoulder and the forward end is beveled.

11. A multifiber connector according to claim 10 wherein the beveled portion of the inner sidewalls of said connector housing extends continuously from the inwardly projecting shoulder to the forward end of said connector housing.

12. A multifiber connector according to claim 10 wherein the portion of the inner sidewalls of said connector housing between the inwardly projecting shoulder and the forward end of said connector housing comprises:

an untapered first segment adjacent the inwardly projecting shoulder; and a beveled second segment adjacent the forward end of said connector housing.

13. A multifiber connector according to claim 8 wherein the portion of the inner sidewalls of said connector housing between the inwardly projecting shoulder and the forward end of said connector housing comprises:

an untapered first segment adjacent the inwardly projecting shoulder; and an untapered second segment adjacent the forward end of said connector housing, wherein the untapered second segment defines a portion of the passageway that has a larger area in lateral cross-section than the portion of the passageway defined by the untapered first segment such that the portion of the inner sidewalls of said connector housing between the inwardly projecting shoulder and the forward end of said connector housing has a stepped configuration.

14. A multifiber connector comprising:

a connector housing extending between forward and rear ends and defining a lengthwise extending passageway therethrough; and a ferrule for mounting upon end portions of a plurality of optical fibers, said ferrule disposed at least partially within the passageway defined by said connector housing; and a pin clamp disposed within the passageway defined by said connector housing and adjacent a rear portion of said ferrule, said pin clamp being mechanically coupled to said ferrule for movement therewith, said pin clamp comprising:

a forward end adjacent the rear portion of said ferrule;

an opposed rear end; and side surfaces extending between the forward and rear ends that are beveled such that the forward end of said pin clamp is larger than said opposed rear end to thereby facilitate rotation of said connector housing relative to said pin clamp and said ferrule in response to side pull forces.

15. A multifiber connector according to claim 14 wherein said ferrule has side surfaces extending lengthwise between opposed forward and rear ends, and wherein the side surfaces of said ferrule adjacent the rear end of said ferrule are also beveled.

16. A multifiber connector according to claim 15 wherein the beveled side surfaces of said ferrule and said pin clamp define continuously beveled surfaces.

17. A multifiber connector according to claim 15 wherein said ferrule has a forward portion and a rear portion that is larger than the forward portion such that said ferrule also includes a shoulder between the forward and rear portions, and wherein the side surfaces of the rear portion of said ferrule are beveled.

18. A multifiber connector according to claim 14 wherein said connector housing has inner and outer sidewalls extending between forward and rear ends, and wherein the inner sidewalls of said connector housing proximate the rear end are beveled such that the passageway defined by said connector housing increases in size in a direction from a medial portion of said connector housing to the rear end of said connector housing.

19. A multifiber connector comprising:

a ferrule for mounting upon end portions of a plurality of optical fibers, said ferrule having a forward portion and a rear portion that is larger than the forward portion such that said ferrule also includes a shoulder between the forward and rear portions; and a connector housing having inner and outer sidewalls extending between forward and rear ends, wherein the inner sidewalls of said connector housing define a lengthwise extending passageway and include a shoulder projecting into the passageway at a location proximate the forward end of said connector housing for engaging the shoulder of said ferrule, wherein the passageway defined by the inner sidewalls of said connector housing defines a longitudinal axis, and wherein the inner sidewalls of said connector housing are continuously tapered at an angle of at least 2° relative to the longitudinal axis from the inwardly projecting shoulder to the rear end of said connector housing such that the portion of the passageway adjacent the rear end of said connector housing is larger in cross-sectional area than the portion of the passageway adjacent the inwardly projecting shoulder to thereby facilitate rotation of said connector housing relative to said ferrule in response to side pull forces.

20. A multifiber connector according to claim 19 wherein said ferrule has side surfaces extending lengthwise between opposed forward and rear ends, and wherein the side surfaces of said ferrule adjacent the rear end of said ferrule are also beveled.

21. A multifiber connector according to claim 19 further comprising a pin clamp disposed within the passageway defined by said connector housing and adjacent the rear portion of said ferrule, said pin clamp being mechanically coupled to said ferrule for movement therewith, said pin clamp comprising:

a forward end adjacent the rear portion of said ferrule;

an opposed rear end; and side surfaces extending between the forward and rear ends that are beveled such that the forward end of said pin clamp is larger than said opposed rear end to thereby facilitate rotation of said connector housing relative to said pin clamp and said ferrule in response to side pull forces.

* * * * *